Dec. 22, 1964     A. A. IACCO     3,162,457
AXIALLY ADJUSTABLE CUTTING TOOL
Filed July 25, 1962
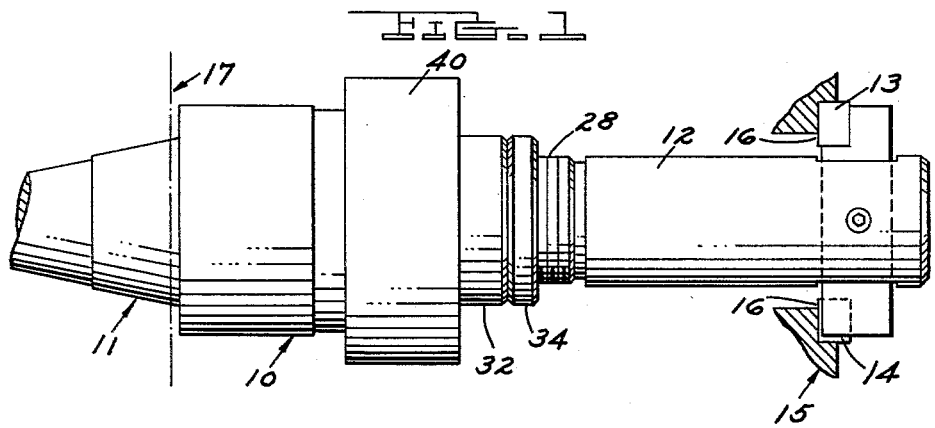
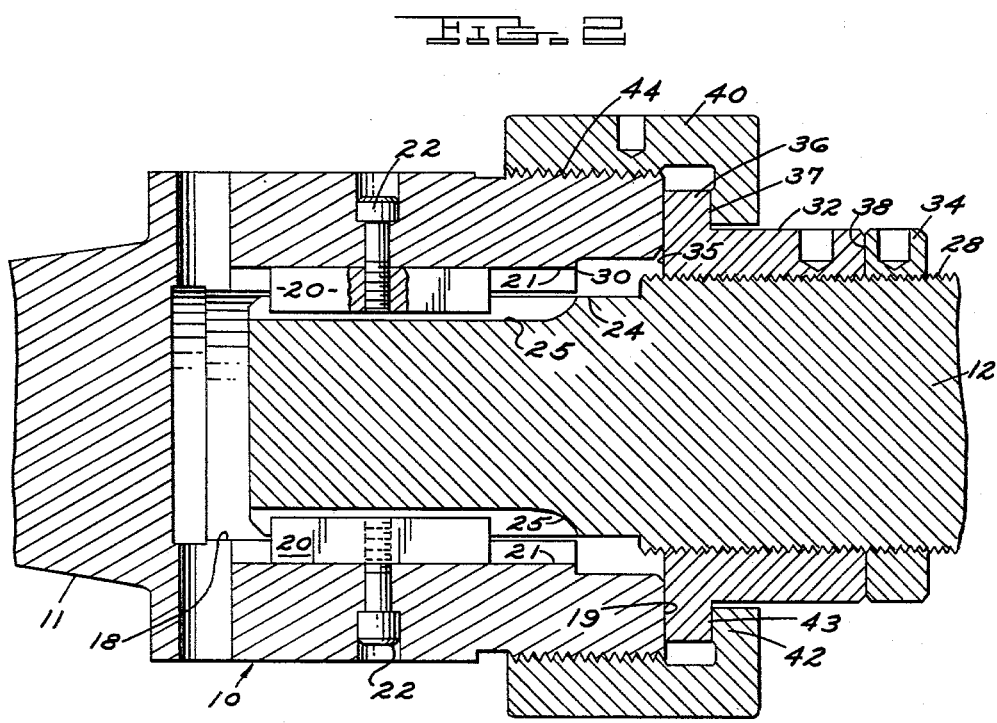
INVENTOR.
ALBERT A. IACCO
BY
*Farley Forster & Farley*
ATTORNEYS … # 3,162,457
AXIALLY ADJUSTABLE CUTTING TOOL
Albert A. Iacco, Gaylord, Mich., assignor to Beaver Tool & Engineering Corporation, Gaylord, Mich., a corporation of Michigan
Filed July 25, 1962, Ser. No. 212,343
4 Claims. (Cl. 279—91)

This invention relates to an improved tool construction for axially positioning a cutter element relative to the gauge line of the spindle of a machine tool, and which permits the cutter element to be precisely set off the machine. The construction has particular utility for tools performing such operations as back spot facing or back counterboring, as well as boring, facing, drilling and counterboring.

Operations of the back counterboring type require the utmost rigidity in the mounting of the cutting tool on the machine spindle, since cutting forces are in a separating direction, and considerable difficulty has been encountered in providing a tool construction which affords sufficient rigidity and at the same time satisfies the added requirement of permitting the position of the cutting element to be precisely adjusted relative to the machine gauge line without disturbing automatic operation controls, if any.

The overall object of the present invention is to provide a tool construction which enables this adjustment to be made in such a way that the cutting element can be accurately pre-set off the machine; which enables the cutting element to be mounted on the machine with extreme rigidity; which provides uniform mounting regardless of any adjustment made; and which is relatively simple and inexpensive.

A tool construction in accordance with the invention includes the combination of a holder adapted to be secured to the machine tool spindle and having a cylindrical socket extending inwardly from the outer end face of the holder, this end face being formed at right angles to the axis of the socket and being positioned in constant relation to the gauge line when the holder is secured to the spindle; and, a tool carrier having a cylindrical shank slidably engageable in the holder socket and an externally threaded portion adjacent to the shank, this threaded portion being engaged by an internally threaded adjusting member or stop collar having a radial end flange directed toward the shank portion of the tool carrier for engagement with the end face of the tool holder. A lock nut is also mounted on the threaded portion of the tool carrier for engagement with the other or outer end of the stop collar to lock the stop collar in adjusted position. A locking collar having an inwardly directed shoulder overlapping and engageable with the flange on the stop collar is mounted on the tool holder by means which permit movement of the locking collar between an unlocked position in which the tool carrier can be inserted into the holder socket to the limit defined by engagement between the holder end face and the radial end flange surface of the stop collar, and a locked position in which the stop collar flange is securely engaged between the holder end face and the shoulder of the locking collar.

The combination of the stop collar and lock nut mounted on the threaded portion of the tool carrier provides an adjustable reference surface—the end face of the stop collar—which is movable axially throughout a range of adjustment along the tool carrier, forming in effect a gauge or reference line which can be set at the distance desired from the cutting edge of the tool with complete precision because the lock nut acting against the end of the stop collar takes up all play in the fit between the threaded members and at the same time positions the stop collar on the tool carrier. When the end face of the stop collar flange is drawn up against the end face of the tool holder by the action of the locking collar, the parts are rigidly united with the cutting element in its desired position.

Other features and advantages of the construction will be apparent from the following description of the presently preferred representative embodiment disclosed in the accompanying drawings which consist of the following views:

FIGURE 1, a side elevation of the combination of a tool holder and tool carrier illustrating a typical back counter-boring operation;

FIGURE 2, an enlarged sectional elevation of the inter-engaging portions of the tool holder and tool carrier.

Referring to FIGURE 1, a tool holder 10, having a shank portion 11 of the type required for the particular machine with which the holder is to be used, provides a mounting for a tool carrier or adapter 12 equipped with cutting elements 13 and 14 for performing a back counterboring operation in a work piece 15. For proper depth control of the cutting operation, particularly with an automated machine tool, the distance between the cutting surfaces 16 of the cutter elements 13 and 14 and the gauge line of the machine tool, indicated at 17, must be accurately set. Precise adjustment of this axial dimension is obtained by the construction shown in detail in FIG. 2.

Holder 10 is provided with a cylindrical socket 18 and an outer end face 19 extending radially to the axis of the socket. A pair of drive keys 20 are each held in an axial slot 21 in the socket 18 by a screw 22.

It will be understood that the tool holder shank 11 is provided with some means by which the holder is secured to the machine tool spindle, these means being conventional and hence not illustrated, thus placing the end face 19 of the holder in fixed relation to the machine gauge line 17.

The adapter or tool carrier 12 includes a shank portion 24 provided with a pair of keyways 25 dimensioned for sliding snug engagement with the socket 18 and drive keys 20. Axially adjacent to the shank portion 24, the tool carrier is formed with an enlarged threaded portion 28, and the holder 10 is provided with a counterbored recess 30 for clearance therewith.

An internally threaded member 32, which will be referred to as a stop collar, is mounted on the threaded portion 28 of the tool carrier along with a lock nut 34. Stop collar 32 includes a radially extending end face 35 and a radially outwardly extending flange portion 36 having a surface 37 directed oppositely from the end face 35. Lock nut 34 engages the opposite end face 38 of the stop collar 32. By rotating the stop collar 32 along the threaded portion 28 of the tool carrier 12, the distance between the cutting edges 16 of the tool elements 13 and 14 and the end face 35 of the stop collar can be varied within the range of adjustment provided, and when the lock nut 34 is tightened against the stop collar, the stop collar is locked into position and any play in the threaded fit is taken up and eliminated. This setting can be accurately made off the machine since the distance between the machine gauge line 17 and the end face 19 of the tool holder is fixed.

The tool carrier 12 is mounted in the holder and rigidly held in position with the end faces of the holder and stop collar in abutment by a locking collar 40 having an inwardly directed shoulder 42 which includes a surface 43 engageable with the surface 37 of the stop collar flange 36. The locking collar is mounted on the tool holder by suitable means, such as the threads 44, which permit the locking collar to be moved between an unlocked position in which the tool carrier can be inserted into the holder socket and a locked position as shown in FIG. 2 in which the locking collar shoulder 42 securely engages and holds the flange of the stop collar against the end face 19 of the tool holder. Tightening of the locking collar 40 against the stop collar 32 removes any play in the threads 44 and results in a very rigid mounting of the tool carrier which can successfully resist the cutting forces tending to separate the tool carrier from the holder.

All parts of the holder are returned to the same position each time a tool carrier is mounted and locked in the holder and therefore there is no interference with any control element of the machine by removing and replacing a tool carrier.

This particular construction, while presently preferred, is considered representative of the invention and therefore changes and modifications within the scope of the following claims are to be considered a part hereof.

I claim:

1. A tool construction for mounting a cutting element on the spindle of a machine in defined relation to the gauge line thereof comprising:
    a holder having a cylindrical socket extending inwardly from the outer end face thereof, said end face being formed at right angles to the axis of the socket, a shank portion at the inner end of the holder, said shank portion adapted to be secured to the machine spindle thereby placing said outer end face in fixed relation to the gauge line;
    a tool carrier having a cylindrical shank slidably engageable in the holder socket and an externally threaded portion axially adjacent the tool carrier shank portion;
    drive means carried by the holder and slidably engaging the tool carrier shank portion; an annular internally threaded stop collar engaging the tool carrier threaded portion, said stop collar including a radially extending end flange providing a radial end surface directed toward the tool carrier shank portion for engagement with the end face of the holder and providing an oppositely directed shoulder;
    means for retaining the stop collar in a desired position on the tool carrier threaded portion;
    a locking collar including a portion overlapping and engageable with said stop collar shoulder;
    and means mounting the locking collar on the holder for movement between an unlocked position in which the tool carrier can be inserted into the holder socket to the limit defined by engagement between the holder end face and the radial end surface of the stop collar and a locked position in which the stop collar shoulder is securely engaged between the holder end face and the locking collar.

2. A tool construction according to claim 1 in which the said means for retaining the stop collar in a desired position on the threaded tool carrier portion comprises a lock nut mounted on said threaded portion for engagement with the end of the stop collar opposite the said flanged end thereof.

3. A tool construction according to claim 1 in which the threaded portion of the tool carrier is formed on a diameter greater than that of the shank thereof, said holder being provided with a counterbored recess in the outer end thereof for clearance with said threaded portion of the tool carrier.

4. A tool construction for mounting a cutting element on the spindle of a machine in defined relation to the gauge line thereof comprising:
    a holder having a cylindrical socket extending inwardly from the outer end face thereof and an externally threaded portion adjacent said end face, said end face being formed at right angles to the axis of the socket, a shank portion at the inner end of the holder, said shank portion adapted to be secured to the machine spindle thereby placing said outer end face in fixed relation to the gauge line;
    a tool carrier having a cylindrical shank slidably engageable in the holder socket and an externally threaded portion axially adjacent the tool carrier shank portion;
    slidably engageable drive means between the holder and tool carrier shank portion; an annular internally threaded stop collar engaging the tool carrier threaded portion, said stop collar including a radially extending end flange providing a radial end surface directed toward the tool carrier shank portion for engagement with the end face of the holder and providing an oppositely directed shoulder;
    means for retaining the stop collar in a desired position on the tool carrier threaded portion;
    and an annular locking collar having internal threads engageable with the externally threaded holder portion and a shoulder extending radially inwardly into overlapping relation with said holder end face for engagement with the shoulder of the stop collar.

References Cited in the file of this patent

UNITED STATES PATENTS

| | | |
|---|---|---|
| 717,199 | Hollm | Dec. 30, 1902 |
| 2,210,811 | Kelpsch | Aug. 6, 1940 |
| 2,717,791 | Packer | Sept. 13, 1955 |